US010698842B1

(12) United States Patent
Dastidar et al.

(10) Patent No.: US 10,698,842 B1
(45) Date of Patent: Jun. 30, 2020

(54) DOMAIN ASSIST PROCESSOR-PEER FOR COHERENT ACCELERATION

(71) Applicant: Xilinx, Inc., San Jose, CA (US)

(72) Inventors: Jaideep Dastidar, San Jose, CA (US); Sagheer Ahmad, Cupertino, CA (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 16/380,856

(22) Filed: Apr. 10, 2019

(51) Int. Cl.
*G06F 13/12* (2006.01)
*G06F 9/38* (2018.01)
*G06F 9/50* (2006.01)
*G06F 9/54* (2006.01)
*G06F 12/0815* (2016.01)

(52) U.S. Cl.
CPC .......... *G06F 13/122* (2013.01); *G06F 9/3877* (2013.01); *G06F 9/5011* (2013.01); *G06F 9/544* (2013.01); *G06F 12/0815* (2013.01)

(58) Field of Classification Search
None
See application file for complete search history.

(56) References Cited

U.S. PATENT DOCUMENTS

| 10,204,064 | B2* | 2/2019 | Willey | H04L 9/0662 |
| 10,419,338 | B2* | 9/2019 | Gray | H04L 45/60 |
| 2014/0025859 | A1* | 1/2014 | Krause | G06F 13/28 |
| | | | | 710/308 |
| 2016/0344629 | A1* | 11/2016 | Gray | H04L 45/60 |
| 2017/0220499 | A1* | 8/2017 | Gray | G06F 13/36 |
| 2018/0287964 | A1* | 10/2018 | Gray | H04L 49/109 |
| 2019/0004990 | A1* | 1/2019 | Van Doren | G06F 13/4234 |
| 2019/0042455 | A1* | 2/2019 | Agarwal | G06F 13/4221 |

OTHER PUBLICATIONS

U.S. Appl. No. 16/208,260, filed Dec. 3, 2018, Entitled: "Scratchpad Memory Management in a Computing System", San Jose, CA USA.
U.S. Appl. No. 16/053,488, filed Aug. 2, 2018, Entitled: "Hybrid Precise and Imprecise Cache Snoop Filtering", San Jose, CA USA.
(Continued)

*Primary Examiner* — Michael Sun
(74) *Attorney, Agent, or Firm* — Patterson + Sheridan, LLP

(57) ABSTRACT

Examples herein describe a peripheral I/O device with a domain assist processor (DAP) and a domain specific accelerator (DSA) that are in the same coherent domain as CPUs and memory in a host computing system. Peripheral I/O devices were previously unable to participate in a cache-coherent shared-memory multiprocessor paradigm with hardware resources in the host computing system. As a result, domain assist processing for lightweight processor functions (e.g., open source functions such as gzip, open source crypto libraries, open source network switches, etc.) either are performed using CPUs resources in the host or by provisioning a special processing system in the peripheral I/O device (e.g., using programmable logic in a FPGA). The embodiments herein use a DAP in the peripheral I/O device to perform the lightweight processor functions that would otherwise be performed by hardware resources in the host or by a special processing system in the peripheral I/O device.

14 Claims, 8 Drawing Sheets

(56) References Cited

OTHER PUBLICATIONS

U.S. Appl. No. 16/141,704, filed Sep. 25, 2018, Entitled: "Scalable Coherence Management Independent of Transport Protocol", San Jose, CA USA.
U.S. Appl. No. 16/053,384, filed Aug. 2, 2018, Entitled: "Logical Transport Over a Fixed PCIE Physical Transport Network", San Jose, CA USA.
U.S. Appl. No. 16/025,762, filed Jul. 2, 2018, Entitled: "Logical Transport Overlayed Over a Physical Transport Having a Tree Topology", San Jose, CA USA.
U.S. Appl. No. 16/024,500, filed Jun. 29, 2018, Entitled: "Transparent Port Aggregation in Multi-Chip Transport Protocols", San Jose, CA USA.
U.S. Appl. No. 15/967,473, filed Apr. 30, 2018, Entitled: "Circuit for and Method of Providing a Programmable Connector of an Integrated Circuit Device", San Jose, CA USA.

\* cited by examiner

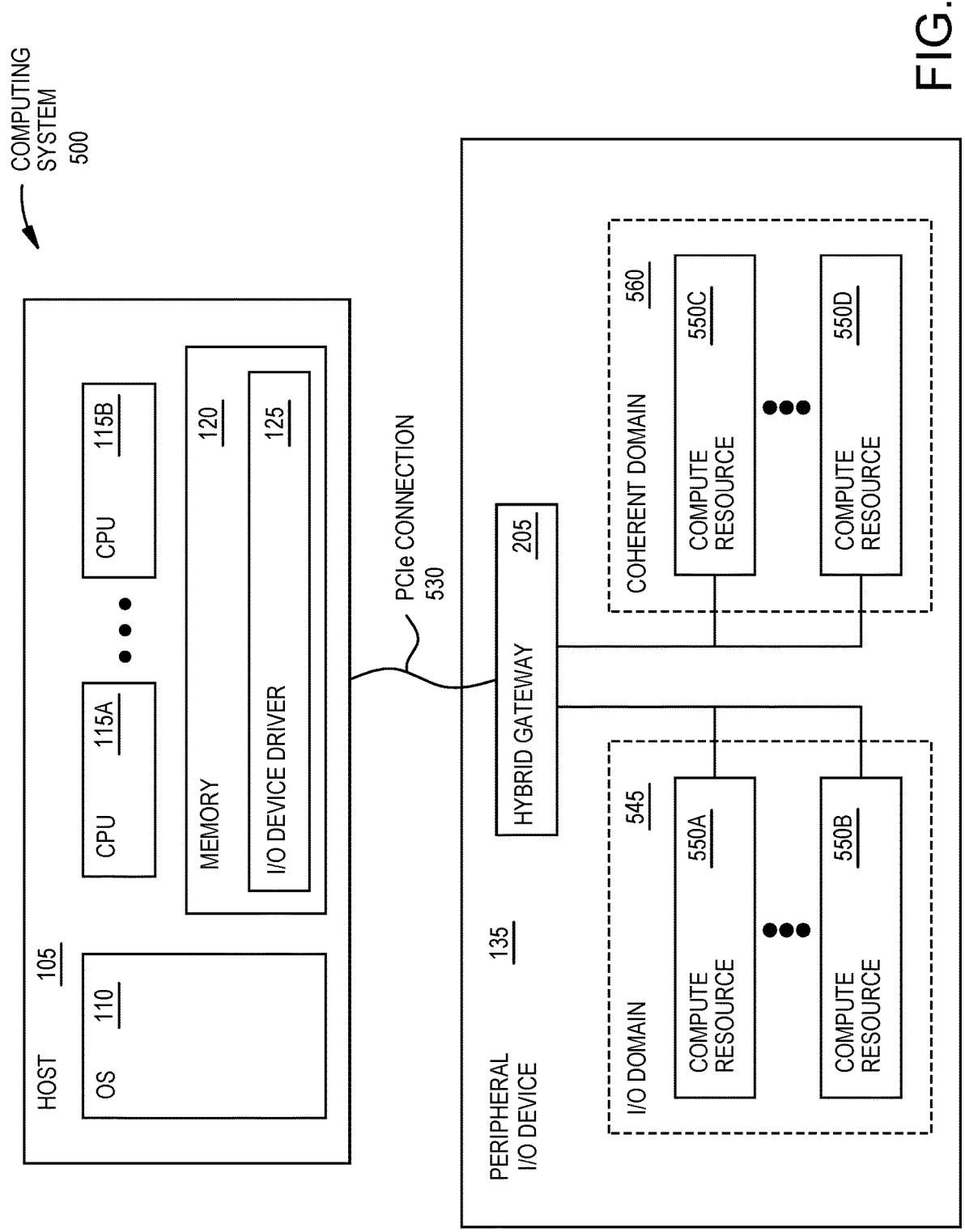

DOMAIN ASSIST PROCESSOR-PEER FOR COHERENT ACCELERATION

TECHNICAL FIELD

Examples of the present disclosure generally relate to a peripheral device with a domain assist processor and a domain specific accelerator.

BACKGROUND

In the traditional I/O model, a host computing system interfaces with its peripheral I/O devices when executing accelerator tasks or functions using custom I/O device drivers unique to the peripheral I/O device. Having multiple I/O devices or even multiple instances of the same I/O device means that the host interfaces with multiple I/O device drivers or multiple running copies of the same I/O device driver. This can result in security and reliability issues since the I/O device drivers are typically developed by the vendor supplying the peripheral I/O devices but must integrate with all the software and hardware in the host computing system.

Meanwhile, the hardware cache-coherent shared-memory multiprocessor paradigm leverages a generic, instruction set architecture (ISA)-independent, model of interfacing in the execution tasks or functions on multiprocessor CPUs. The generic, ISA-independent (e.g., C-code) model of interfacing scales with both the number of processing units and the amount of shared memory available to those processing units. Traditionally, peripheral I/O devices have been unable to benefit from the coherent paradigm used by CPUs executing on the host computing system.

SUMMARY

Techniques for operating a domain assist processor in a peripheral device are described. One example is a peripheral I/O device that includes a domain assist processor (DAP), a domain accelerator, and a gateway configured to communicatively couple the peripheral I/O device to a host using a coherent interconnect protocol where the coherent interconnect protocol extends a coherent domain in the host to the peripheral I/O device such that the DAP is a peer processor to a processor in the host. The gateway is configured to receive a first request from the host using the coherent interconnect protocol, the first request instructing the DAP to perform a processor function and receive a second request from the host using the coherent interconnect protocol, the second request instructing the domain accelerator to perform an accelerator task.

Another example is a method that includes identifying a processor function to offload from a CPU-memory complex in a host to a DAP in a peripheral I/O device, wherein a coherent domain including the CPU-memory complex of the host extends to the DAP in the peripheral I/O device, instructing, using a coherent interconnect protocol, the DAP to perform the processor function and store resulting data in a memory element in the coherent domain, instructing, using the coherent interconnect protocol, a domain accelerator in the peripheral I/O device to process the resulting data when performing an accelerator task for the host, and receiving resulting data from performing the accelerator task on the domain accelerator.

Another example is a computing system that includes a host comprising CPU-memory complex in a coherent domain and a peripheral I/O device that includes a domain assist processor, a domain accelerator, and a gateway configured to communicatively couple the peripheral I/O device to the host using a coherent interconnect protocol, wherein the coherent interconnect protocol extends the coherent domain in the host to include the DAP. The gateway is configured to communicatively couple the peripheral I/O device to the host using a coherent interconnect protocol, wherein the coherent interconnect protocol extends the coherent domain in the host to include the DAP. The gateway is configured to receive a first request from the host instructing the DAP to perform a processor function and receive a second request from the host instructing the domain accelerator to perform an accelerator task.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 5 is a block diagram of a host coupled to a peripheral I/O device with I/O and coherent domains, according to an example.

DETAILED DESCRIPTION

Figure 1:
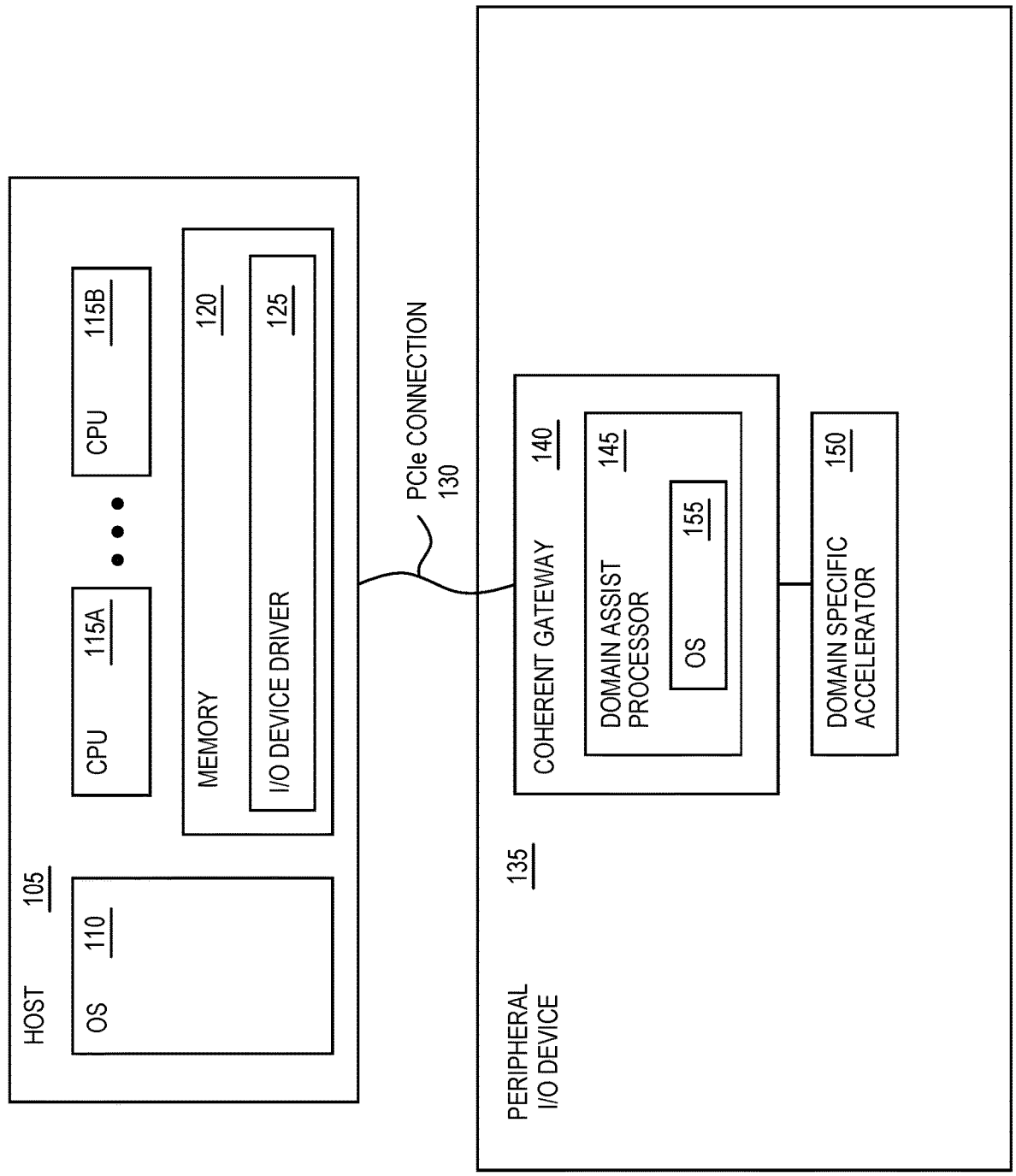
FIG. 1 is a block diagram of a host coupled to a peripheral I/O device containing a domain assist processor and a domain specific accelerator, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe a peripheral I/O device with a domain assist processor (DAP) and a domain specific accelerator (DSA) that are in the same coherent domain as CPUs and memory in a host computing system. As mentioned above, peripheral I/O devices were previously unable to participate in a cache-coherent shared-memory multiprocessor paradigm with hardware resources in the host computing system. As a result, domain assist processing for lightweight, generic processor functions (e.g., open source functions such as gzip, open source crypto libraries, open source network switches, etc.) either are performed using CPU resources in the host or by provisioning a special processing system in the peripheral I/O device (e.g., using programmable logic in a FPGA). However, using the CPUs in the host to perform lightweight processor functions means these CPUs are unavailable to perform heavyweight functions and also wastes power. Further, provisioning special processing systems in an FPGA means less programmable logic is available in the FPGA for performing the accelerator tasks (which are different tasks than the lightweight processor functions).

The embodiments herein use a DAP in the peripheral I/O device to perform the lightweight processor functions that would otherwise be performed by hardware resources in the host or by a special processing system in the peripheral I/O device. In one embodiment, the DAP is a processor subsystem which includes a processor that executes an operating system. Using a peripheral coherent interconnect permits the DAP in the peripheral I/O device to share the same coherent domain with the hardware resources in the host computing system. Without the peripheral coherent interconnect, the DAP would be an embedded system which cannot be viewed by the compute resources in the host. In that case, the host can communicate with the DAP only through an I/O device driver. By adding the DAP to same coherent domain as the hardware resources in the host computing system, the DAP becomes a peer of the CPUs in the host computing system. Put differently, the DAP and the host CPUs are both managed by the same operating system (OS) or kernel in the host computing system. As a result, the OS or kernel in the host can intelligently decide what lightweight processor functions can be offloaded to the DAP in the peripheral I/O device and what functions should be performed by the CPUs in the host computing system.

In one embodiment, the OS offloads the processor functions which are part of accelerator tasks assigned to the DSA in the peripheral I/O device. As an example, the OS may instruct the DAP to perform a gzip function to decompress a compressed data file. The OS may also instruct the DSA to then perform a word or phrase search in the decompressed data. Rather than a CPU in the host having to first perform the gzip function, in this example, the OS can offload the execution of both the gzip function and the accelerator task (e.g., the word search) to the peripheral I/O device.

FIG. 1 is a block diagram of a host coupled to a peripheral I/O device containing a domain assist processor and a domain specific accelerator, according to an example. The computing system 100 in FIG. 1 includes the host 105 which is communicatively coupled to the peripheral I/O device 135 using a PCIe connection 130. The host 105 can represent a single computer (e.g., a server) or multiple physical computing systems that are interconnected. In any case, the host 105 includes an operating system (OS) 110, multiple CPUs 115, and memory 120. The OS 110 can be any OS capable of performing the functions described herein. In one embodiment, the OS 110 (or a hypervisor or kernel) establishes a cache-coherent shared-memory multiprocessor paradigm for the CPUs 115 and memory 120 (referred to as a CPU-memory complex). Stated differently, the CPUs 115 and the memory 120 are OS managed (or kernel/hypervisor managed) to form a coherent domain that follows the cache-coherent shared-memory multiprocessor paradigm. However, as mentioned above, the traditional I/O model means the peripheral I/O device 135 (and all its compute resources) is excluded from the coherent domain established in the host 105. In the traditional model, the host 105 relies solely on an I/O device driver 125 stored in its memory 120 to manage and communicate with the compute resources in the I/O device 135. That is, the peripheral I/O device 135 is controlled by, and is accessible through, the I/O device driver 125.

In the embodiments herein, the coherent shared-memory multiprocessor paradigm is extended to the peripheral I/O device 135 along with all the performance advantages, software flexibility, and reduced overhead of that paradigm. Further, adding compute resources in the I/O device 135 to the same coherent domain as the CPUs 115 and memory 120 allows for a generic, ISA-independent development environment where hardware resources in the host 105 can use a different ISA than the hardware resources in the peripheral I/O device 135. That is, the compute system is ISA agnostic. However, in other embodiments, the coherent shared-memory multiprocessor paradigm may require the hardware resources in both the host 105 and the I/O device 135 use the same ISA rather than different ISAs.

As shown in FIG. 1, the peripheral I/O device 135 includes a coherent gateway 140 which uses a coherent interconnect protocol to extend the coherent domain that includes the CPUs 115 and memory 120 of the host 105 into the peripheral I/O device 135. That is, the DAP 145 and DSA 150 in the I/O device 135 share the same coherent domain as the CPUs 115 and memory 120. As a result, the DAP 145 is a peer processor with the CPUs 115 in the host 105. In one embodiment, the CPUs 115 and the DAP 145 are both managed by the OS 110 or a kernel or hypervisor executing on the host 105. Further, the cache-coherent shared-memory multiprocessor paradigm can permit the use of non-uniform memory access (NUMA) attributes where the OS 110 can make intelligent decisions about assigning tasks based on proximity. That is, using NUMA attributes, the OS 110 can know that the CPUs 115 are co-located with the memory 120 on the host computing system 105, while the DAP 145 (and any associated memory in the peripheral I/O device 135) is located in the I/O device 135. Thus, although the CPUs 115 and the DAP 145 are peers, they have different proximities to the memory in the system which can result in different latencies. As such, the OS 110 can intelligently assign tasks based on the location and proximity of the CPUs 115 and the DAP 145 to the various memory elements in the system.

The DAP 145 includes its own OS 155. In one embodiment, the OS 155 is an independent, embedded OS. However, in another embodiment, the shared memory multiprocessor paradigm allows for the OS 155 either be the same as the OS 110 in the host 105, or a subset of the OS 110. For example the OS 155 can be an extension of the OS 110 that manages memory and compute resources on peripheral device 135.

Regardless whether the OS 155 is an independent OS or a part or extension the OS 110, because the DAP 145 is managed by the OS 110 in the host 105, the OS 110 can submit tasks to the OS 155 which then controls the hardware elements in the DAP 145 to complete the task. For example, the DAP 145 may be an ARM processor, but could be a processor that uses another type of ISA such as x86 or PowerPC®. In any case, the DAP 145 and the OS 155 can execute generic functions that would otherwise need to be performed by the CPUs 115 or by a special processing system in the peripheral I/O device 135 (e.g., using programmable logic (PL) if the I/O device 135 is a FPGA). In one embodiment, the DAP 145 is a CPU, although its compute power may be much less than the CPUs 115 in the host 105. Further, the DAP 145 may include one or multiple processing cores (e.g., multiple ARM cores) and can include local memory such as local DDR memory that stores the OS 155. In the traditional model, the OS 155 is opaque or invisible to the OS 110 on the host 105. That is, the OS 110 would simply view the entire I/O device 135 as a whole without knowing what different types of hardware elements are in the I/O device 135. With the addition of the coherent gateway 140 and the coherent interconnect protocol, the OS 110 can view the DAP 145 as a peer processor to the CPUs 115. The OS 110 can determine whether the DAP 145 has available compute resources (or available compute time), available local memory, the proximity of the DAP 145 to memory elements in the I/O device 135 and the host 105, and other advantages enabled by adding the DAP 145 to the same coherent domain as the host 105.

The DSA 150 is an accelerator that performs acceleration task for the host 105. In one embodiment, the DSA 150 is part of the same coherent domain as the host 105 and the DAP 145, although this is not a requirement. For example, the DSA 150 may be assigned to an I/O domain which is managed by the I/O device driver 125 rather than being managed by the OS 110. In yet another embodiment, a portion of the hardware elements in the DSA 150 may be assigned to the coherent domain (and are OS/kernel managed) while the remaining portion of the hardware elements in the DSA 150 are assigned to the I/O domain (and are managed by the I/O device driver 125).

The DSA 150 may include hardened circuitry, programmable circuitry (e.g., PL), or combinations thereof. For example, the DSA 150 may include specialized processing elements (e.g., an array of multiply-accumulators or data processing engines) or a graphics processing unit (GPU). The DSA 150 may include a PL array with a plurality of configurable blocks. Further, the DSA 150 may include a mix of specialized processing elements (e.g., an array of data processing engines) and PL.

Figure 2:
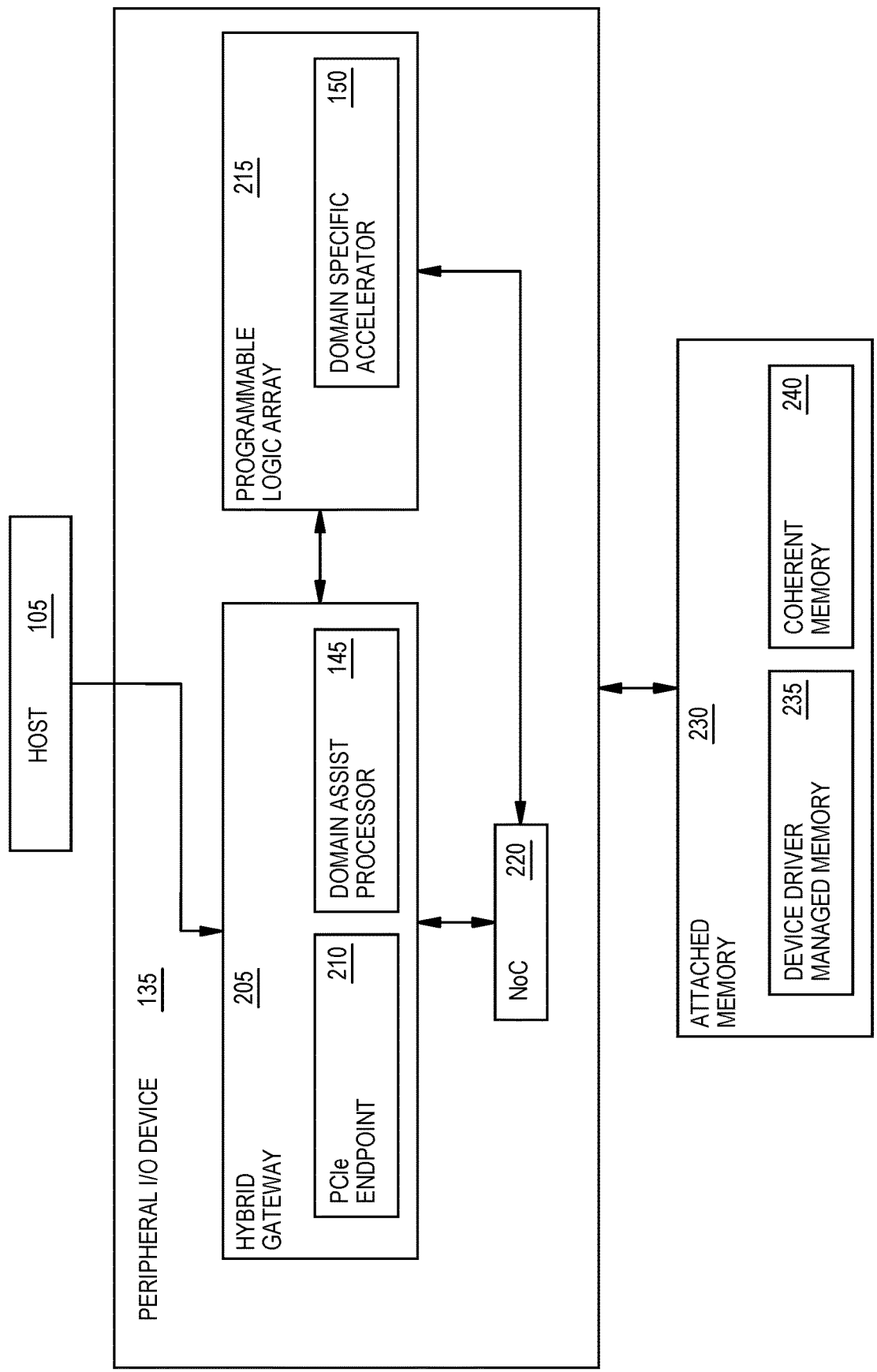
FIG. 2 is a block diagram of a peripheral I/O device with a hybrid gateway, according to an example.

FIG. 2 is a block diagram of a peripheral I/O device with a hybrid gateway, according to an example. For simplicity, the various hardware and software elements in the host 105 are not shown. The peripheral I/O device 135 includes a hybrid gateway 205 which permits the hardware elements in the device 135 to be logically divided into a coherent domain and an I/O domain. The various ways for dividing the hardware elements into these domains will be discussed later.

To extend the coherent domain of the host 105 into the peripheral I/O device 135, the hybrid gateway uses a coherency interconnect protocol. For example, the hybrid gateway 205 may use cache coherent interconnect for accelerators (CCIX) for forming the coherent domain. CCIX is a high-performance, chip-to-chip interconnect architecture that provides a cache coherent framework for heterogeneous system architectures. CCIX brings kernel managed semantics to a peripheral device. Cache coherency is automatically maintained at all times between the CPU(s) on the host 105 and the various other accelerators in the system which may be disposed on any number of peripheral I/O devices. However, other coherent interconnect protocols may be used besides CCIX such as QuickPath Interconnect (QPI) or Omni-Path, to extend the coherent domain in the host 105 to include compute resources in the peripheral I/O device 135.

The hybrid gateway 205 includes a peripheral component interconnect express (PCIe) endpoint 210 and the DAP 145. The PCIe endpoint 210 enables the hybrid gateway 205 to use PCIe communication techniques to transfer data between the host 105. For example, I/O domain traffic and the coherent domain traffic may be transferred using the same PCIe connection (or connections). In one embodiment, special headers or header values can be used to indicate which data packets are I/O domain traffic and which are coherent domain traffic.

In FIG. 2, the hybrid gateway 205 is communicatively coupled to a PL array 215 and network on a chip (NoC) 220. The PL array 215 includes the DSA 150 which performs the accelerator tasks provided by the host 105. For example, DSA 150 may be configured (using the PL) to perform machine learning tasks, cryptographic acceleration, compression/decompression tasks, digital or analog processing tasks, graphic acceleration, simulations, and the like. Moreover, as mentioned above, the DSA 150 may be implemented using only PL, only hardened circuitry, or a mix of hardened circuitry and PL.

In one embodiment, the NoC 220 includes interface elements which permit hardware elements in the I/O device 135 (e.g., the DSA 150, memory elements, the hybrid gateway 205, and the like) to transmit and receive data. In one embodiment, rather than using PL to form the NoC 220, some or all of the components forming the NoC 220 are hardened. In any case, as described in more detail later, the NoC 220 can be logically divided between the I/O domain and the coherent domain.

In FIG. 2, the peripheral I/O device 135 is coupled to an attached memory 230. The attached memory 230 may be a separate integrated circuit from an integrated circuit forming the peripheral device 135 (e.g., a system on a chip (SoC)). The I/O device 135 may be communicatively coupled to the attached memory 230 using a high-speed bus. However, using the attached memory 230 is optional. Further, the peripheral I/O device 135 may include internal memory elements (and internal memory controllers).

The attached memory 230 includes device driver managed memory 235 and coherent memory 240. The device driver managed memory 235 is managed by the I/O device driver in the host 105 (not shown) while the coherent memory 240 is managed by the OS/kernel/hypervisor in the host 105 (also not shown in FIG. 2). As such, the device driver managed memory 235 is part of the I/O domain while the coherent memory 240 is part of the coherent domain. As a result, hardware elements in the peripheral I/O device 135 assigned to the I/O domain may be able to communicate with the device driver managed memory 235 but not the coherent memory 240 while the hardware elements assigned to the coherent domain can communicate with the coherent memory 240 but not the device driver managed memory 235.

Figure 3:
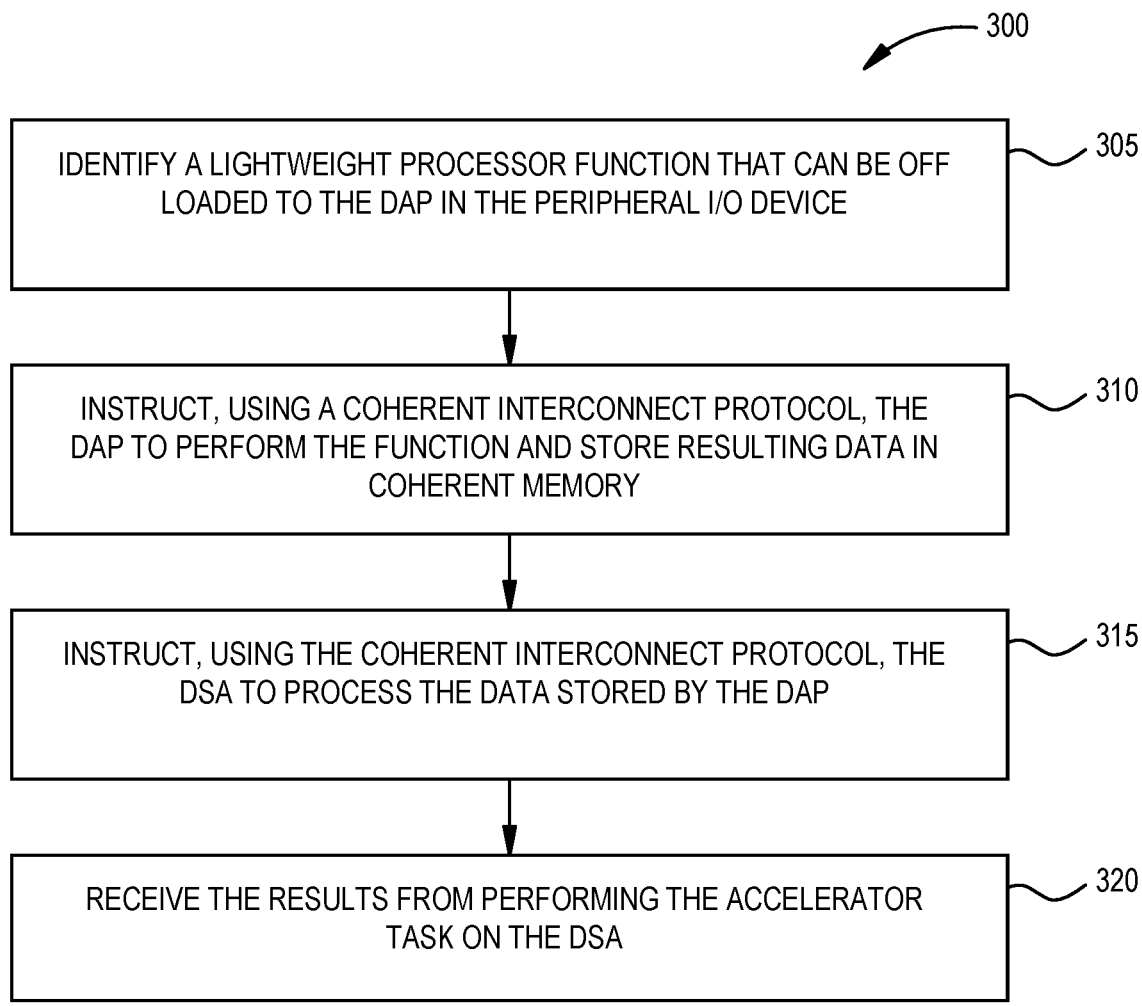
FIG. 3 is a flowchart for assigning tasks to the domain assist processor and the domain specific accelerator, according to an example.

FIG. 3 is a flowchart of a method 300 for assigning tasks to the DAP and the DSA, according to an example. At block 305, the OS in the host (or a kernel or hypervisor in the host) identifies a lightweight, generic processor function that can be offloaded to the DAP in the peripheral I/O device. In one embodiment, the DAP is ill-suited to perform heavyweight functions (e.g., executing a server database application, or the Ethernet TCP/IP software stack) but can perform lightweight processor functions. In one embodiment, these lightweight processor functions are open source libraries or industry standard software applications. Examples of lightweight processor functions suitable for the DAP include compression/decompression algorithms (e.g., gzip) or secondary processing when performing data plane network routing. These functions may be better suited for the DAP than the CPU-memory complex in the host.

In one embodiment, the processor function offloaded to the DAP is associated with an accelerator task assigned to the DSA. In one embodiment, the data generated by the DAP when performing the lightweight processor function is then transmitted to the DSA to be processed when performing the accelerator task. For example, the scheduler in the OS may instruct the DAP to decompress a two MB file which results in a 100 MB file of uncompressed data. The DAS may then perform an accelerator task (e.g., a search) on the uncompressed data. In this case, the accelerator task has a data dependency on the lightweight function performed by the DAP.

In one embodiment, the processor function offloaded to the DAP is a lightweight OS scheduler module, a subset of OS 110 responsible for scheduling tasks on the DAP and DSA. In one embodiment, the lightweight OS scheduler decides which of the available functions offloaded to the DAP is dispatched as the next processor function to be executed by the DAP. In another embodiment, the lightweight OS scheduler decides which of the available data dependent functions completed by the DAP, is dispatched as the next task to be executed by the DSA.

At block 310, the OS in the host instructs, using the coherent interconnect protocol, the DAP to perform the function and store resulting data in coherent memory. Because the host and at least a portion of the I/O device are in the same coherent domain, the OS in the host can use the coherent interconnect protocol (e.g., CCIX, QPI, or Omni-Path) to instruct the DAP to perform the lightweight function, thereby bypassing the I/O device driver. If all of the hardware elements are assigned to the same coherent domain as the host, then the host may not have an installed I/O device driver (e.g., the I/O device driver is not needed since there is no I/O domain in the I/O device).

The OS can use any of the known tools in a cache-coherent shared-memory multiprocessor paradigm to provide instructions to the DAP. For example, because the DAP is a peer processor to the CPUs in the host, the OS can use the same semantics to communicate and manage the DAP as it uses with the CPUs in the host. These semantics can include semaphores, doorbells, implicit updates, and the like.

The OS can instruct the DAP to store the result of performing the lightweight function in a particular memory. Using NUMA attributes, the OS can know the proximity of the DAP to memory elements in the system (which can include memory elements in the host, in the peripheral I/O device, and in an attached memory). If the data is intended to be used by the DSA to perform an accelerator task, the OS may instruct the DAP to store the data in either memory elements in the I/O device or in the attached memory since this may provide lower latency relative to storing the data in the host. However, if the lightweight function performed by the DAP is not related to the accelerator task assigned to the DSA, the OS may instruct the DAP to store the resulting data in the host (e.g., if a CPU in the host needs the data).

At block 315, the OS instructs, using the coherent interconnect protocol, the DSA to process the data stored by the DAP. In this example, there is a data dependency between the data generated by the DAP and the accelerator task performed by the DAS. In one embodiment, the OS instructs the DSA to wait for a ready signal from the DAP that it has data ready to be processed by the DSA. Using the example above, once the DAP has finished decompressing the compressed data, the DAP can inform the DSA where the uncompressed data is stored so that the DSA can retrieve the data (e.g., using the NoC) and perform the accelerator task.

At block 320, the host receives the results from performing the accelerator task on the DSA. Because the DSA may be part of the coherent domain, the I/O device can use the gateway and the coherent interconnect protocol to transfer the data generated by the DSA as part of performing the accelerator function to the host. The OS can then inform a CPU in the host that the accelerator task is complete and where the resulting data can be found in memory.

Figure 4A:
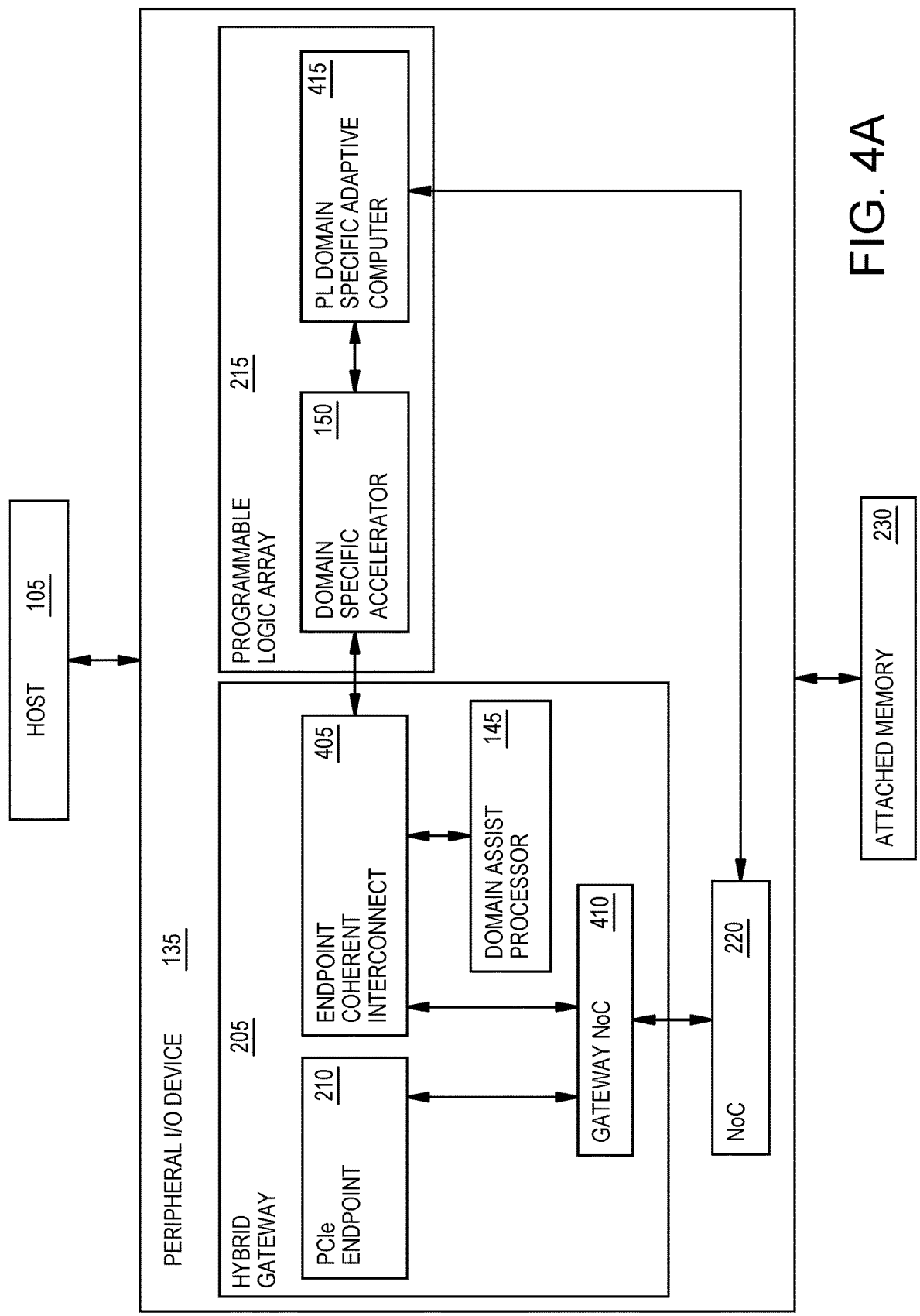
FIG. 4A is a block diagram of a gateway with an endpoint coherent interconnect connected to the domain assist processor and the domain specific accelerator, according to an example.

FIG. 4A is a block diagram of a hybrid gateway 205 with an endpoint coherent interconnect 405 connected to the DAP 145 and the DSA 150, according to an example. The DAP 145 is part of the same coherent domain as the CPU-memory complex in the host 105. Thus all the resources can be OS or kernel managed and the shared memory multiprocessor paradigm is extended to the accelerator—e.g., the I/O device 135. That said, using a coherent interconnect protocol also enables the shared memory multiprocessor model such that the host 105 and the DAP 145 can have different ISAs. Further, the DSA 150 is connected to a PL domain specific adaptive computer 415, for example, a custom processor that executes a specific subset of the host 105 ISA or DAP 150 ISA, or a custom processor, which can also be implemented using the PL in the PL array 215. In one embodiment, the PL domain specific adaptive computer 415 is a PL DAP, providing the flexibility to execute a specific subset ISA or custom ISA in programmable logic for improved computational efficiency.

Figure 4B:
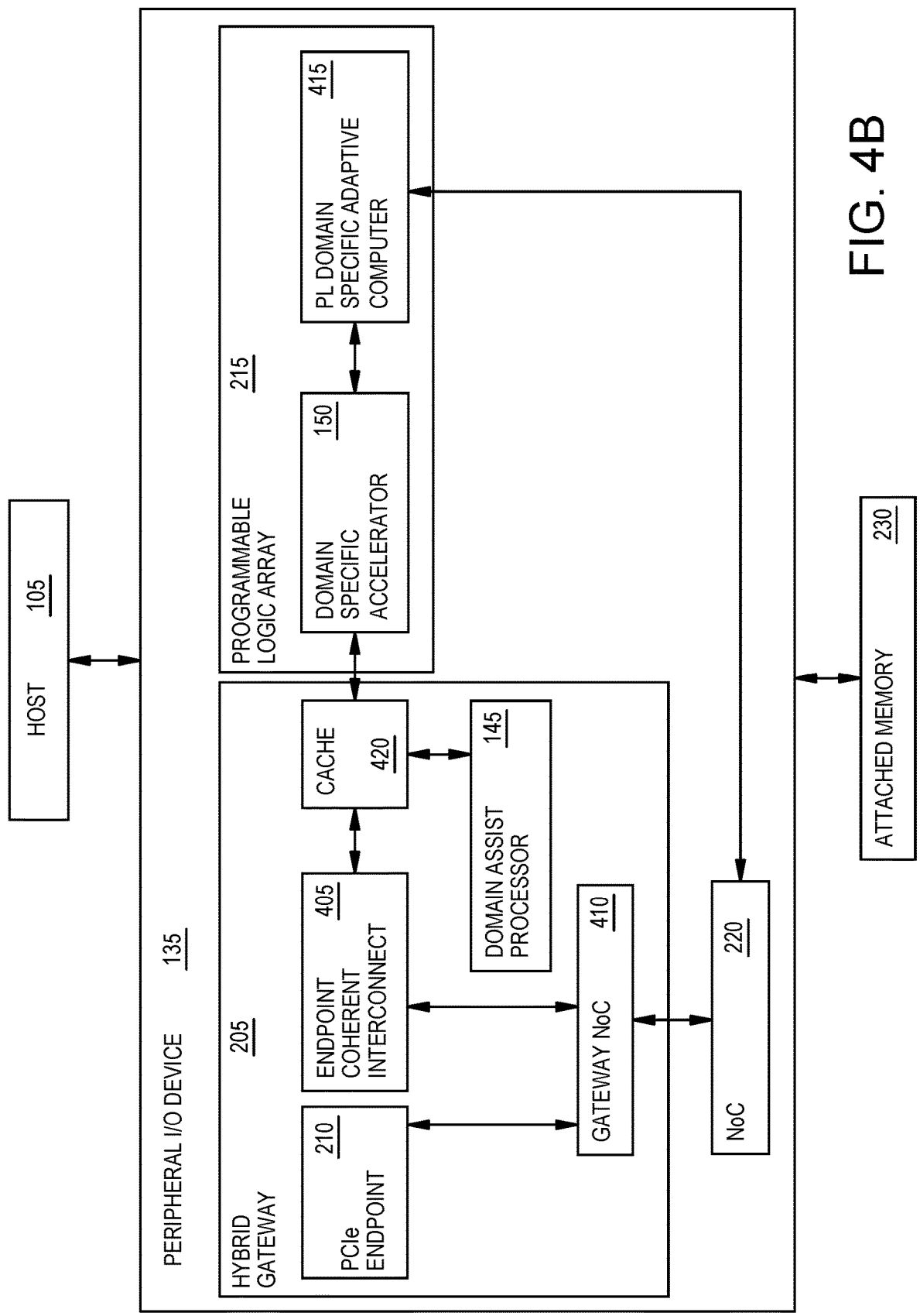
FIG. 4B is a block diagram of a gateway with a cache connected to the domain assist processor and the domain specific accelerator, according to an example.

FIG. 4A illustrates a first DSA/DAP topology where the DSA 150 (which is also assigned to the coherent domain) has its DAP 145 connected via the same endpoint coherent interconnect 405. FIG. 4B is similar to I/O device 135 illustrated in FIG. 4A except that FIG. 4B illustrates a second, different DSA/DAP topology. In FIG. 4B, both the DSA 150 and the DAP 145 are attached to a shared cache 420 for low latency pre- and post-DSA processed data access.

In one embodiment, in addition to sharing the same coherent domain as the CPU-memory complex in the host 105, the I/O devices 135 illustrated in FIGS. 4A and 4B also enable data movement via the traditional I/O Device Driver managed model—for example data movement of either the pre-processed accelerator data footprint or the post-processed footprint from/to the host memory. Moreover, the hybrid gateway 205 includes a gateway NoC 410 which facilitates communication between hardware elements in the gateway 205 (e.g., the PCIe endpoint 210 and the endpoint coherent interconnect 405) and the NoC 220.

FIG. 5 is a block diagram of the host 105 coupled to a peripheral I/O device 135 with I/O and coherent domains, according to an example. The computing system 500 in FIG. 5 includes the host 105 (e.g., the host 105 in FIG. 1) which is communicatively coupled to the peripheral I/O device 135 using a PCIe connection 530. As mentioned above, the CPUs 115 and the memory 120 are OS managed (or kernel/hypervisor managed) to form a coherent domain that follows the cache-coherent shared-memory multiprocessor paradigm. Under the traditional I/O model, the peripheral I/O device 135 (and all its compute resources 550) is excluded from the coherent domain established in the host 105. In the traditional model, the host 105 relies on the I/O device driver 125 stored in its memory 120 to manage the compute resources 550 in the I/O device 135. That is, the peripheral I/O device 135 is controlled by, and is accessible through, the I/O device driver 125.

While the compute resources 550C and 550D are logically assigned to a coherent domain 560, the compute resources 550A and 550B are assigned to an I/O domain 545. As such, the I/O device 135 benefits from having compute resources 550 assigned to both domains 545, 560. While the I/O domain 545 provides efficiencies when doing large memory transfers between the host 105 and the I/O device 135, the coherent domain 560 provides the performance advantages, software flexibility, and reduced overhead mentioned above. By logically dividing the hardware compute resources 550 (e.g., programmable logic, a network on the chip (NoC), data processing engines, and/or memory) into the I/O domain 545 and the coherent domain 560, the I/O device 135 can benefit from both types of paradigms.

To enable the host 105 to send and receive both I/O and coherent data traffic, the peripheral I/O device 135 includes the hybrid gateway 205 which separates the data received on the PCIe connection 530 into I/O data traffic and coherent data traffic. The I/O data traffic is forwarded to the compute resources 550A and 550B in the I/O domain 545 while the coherent data traffic is forwarded to the compute resources 550C and 550D in the coherent domain 560. In one embodiment, the hybrid gateway 205 can process the I/O and coherent data traffic in parallel so that the compute resources 550 in the I/O domain 545 can execute in parallel with the compute resources 550 in the coherent domain 560. That is, the host 105 can assign tasks to both the compute resources 550 in the I/O domain 545 and in the coherent domain 560 which can execute those tasks in parallel.

The peripheral I/O device 135 can be many different types of I/O devices such as a pluggable card (which plugs into an expansion slot in the host 105), a SoC, a GPU, a FPGA and the like. While the embodiments herein discuss dividing the compute resources 550 into two domains, in other embodiments the hybrid gateway 205 can be modified to support additional domains or multiple sub-domains within the I/O and coherent domains 545, 560.

Figure 6:
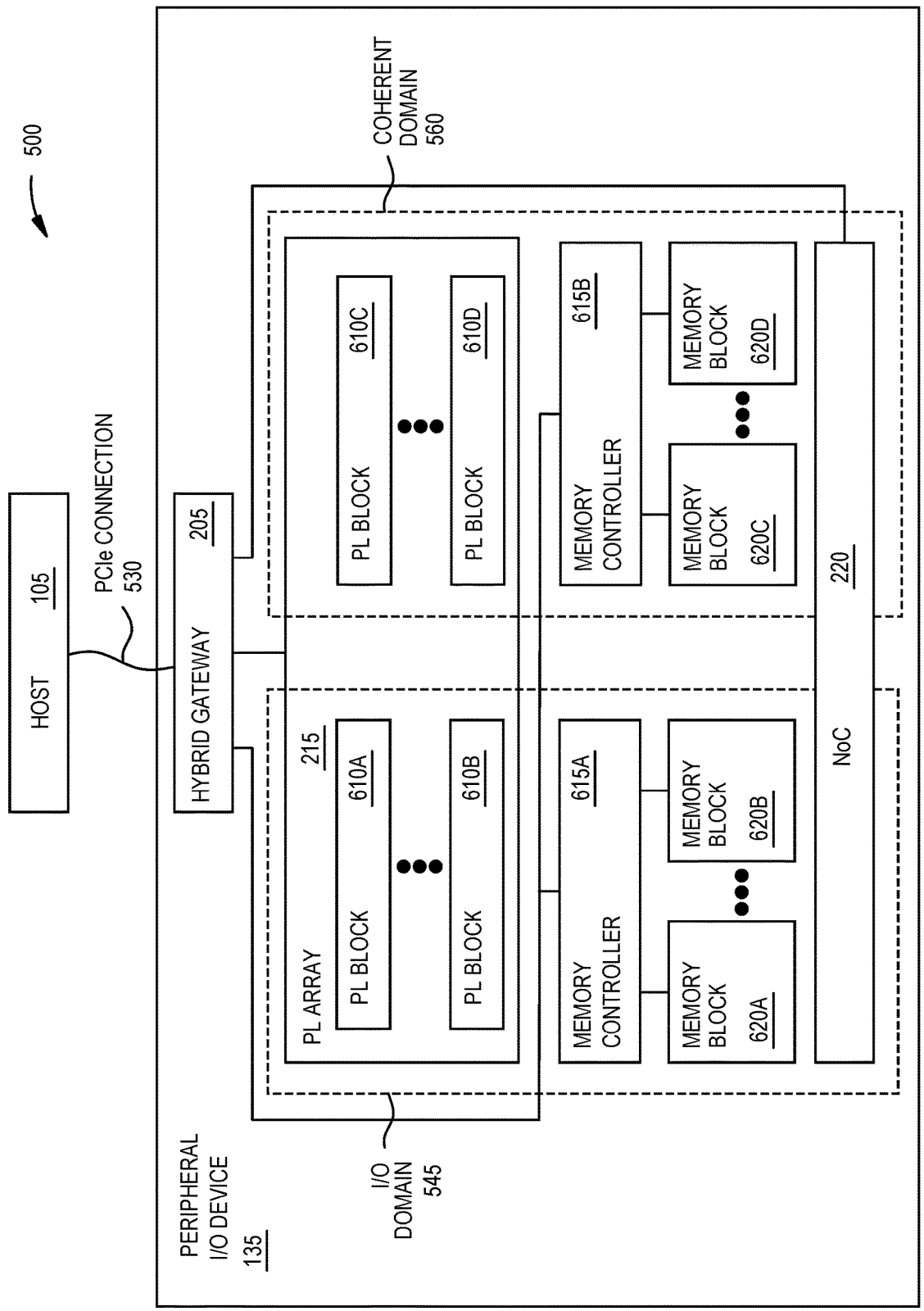
FIG. 6 is a block diagram of a peripheral I/O device with programmable logic, memory, and a network on a chip logically divided into I/O and coherent domains, according to an example.

FIG. 6 is a block diagram of a peripheral I/O device 135 with the PL array 215, memory blocks 620, and the NoC 220 logically divided into I/O and coherent domains 545, 560, according to an example. In this example, the PL array 215 is formed from a plurality of PL blocks 610. These blocks can be individually assigned to the I/O domain 545 or the coherent domain 560. That is, the PL blocks 610A and 610B are assigned to the I/O domain 545 while the PL blocks 610C and 610D are assigned to the coherent domain 560. In one embodiment, the set of PL blocks 610 assigned to the I/O domain is mutually exclusive to the set of PL blocks 610 assigned to the coherent domain such that there is no overlap between the blocks (e.g., no PL block 610 is assigned to both the I/O and coherent domains). In one embodiment, the PL blocks 610A and 6106 may be used to form a DSA in the I/O domain 545 while the PL blocks 610C and 610D are used to form a DSA in the coherent domain 560.

In one embodiment, the assignment of the hardware resources to either the I/O domain 545 or the coherent domain 560 does not affect (or indicate) the physical location of the hardware resources in the I/O device 135. For example, the PL blocks 610A and 610C may be assigned to different domains even if these blocks neighbor each other in the PL array 215. Thus, while the physical location of the hardware resources in the I/O device 135 may be considered when logically assigning them to the I/O domain 545 and the coherent domain 560, it is not necessary.

The I/O device 135 also includes memory controllers 615 which are assigned to the I/O domain 645 and the coherent domain 660. In one embodiment, because of the physical interconnection between the memory controllers 615 and the corresponding memory blocks 620, assigning one of the memory controllers 615 to either the I/O or coherent domain 545, 560 means all the memory blocks 620 connected to the memory controller 615 are also assigned to the same domain. For example, the memory controllers 615 may be coupled to a fix set of memory blocks 620 (which are not coupled to any other memory controller 615). Thus, the memory blocks 620 may be assigned to the same domain as the memory controller 615 to which they are coupled. However, in other embodiments, it may be possible to assign memory blocks 620 coupled to the same memory controller 615 to different domains.

In one embodiment, the NoC 220 includes interface elements which permit hardware elements in the I/O device 135 (e.g., configurable data processing engines, the memory blocks 620, the PL blocks 610, and the like) to transmit and receive data using the NoC 220. In one embodiment, rather than using programmable logic to form the NoC 220, some or all of the components forming the NoC are hardened. In any case, the NoC 220 can be logically divided between the I/O domain 545 and the coherent domain 560. In one embodiment, instead of assigning different portions of the NoC 220 to the two domains, the parameters of the NoC are configured to provide different service levels for the data traffic corresponding to the I/O domain 545 and the coherent domains 560. That is, the data traffic for both domains flowing in the NoC 220 may use the same hardware elements (e.g., switches and communication links) but may be treated differently by the hardware elements. For example, the NoC 220 can provide different quality of service (QoS), latency, bandwidth, for the two different domains. Further, the NoC 220 can also isolate the traffic of the I/O domain 545 from the traffic of the coherent domain 560 for security reasons.

In another embodiment, the NoC 220 can prevent the compute resources in the I/O domain 545 from communicating with the compute resources in the coherent domain 560. However, in one embodiment it may be advantageous to permit the compute resources assigned to the I/O domain 545 to communicate with compute resources assigned to the coherent domain 560. Previously, this communication would occur between the I/O device driver 125 and the OS in the host 105. Instead, inter-domain communication can occur within the I/O device 135 using the NoC 220 (if the compute resources are far apart in the device 135) or a fabric-to-fabric connection in the PL array 215 (if two PL blocks 610 assigned to the two different domains are close together and need to communicate).

Figure 7:
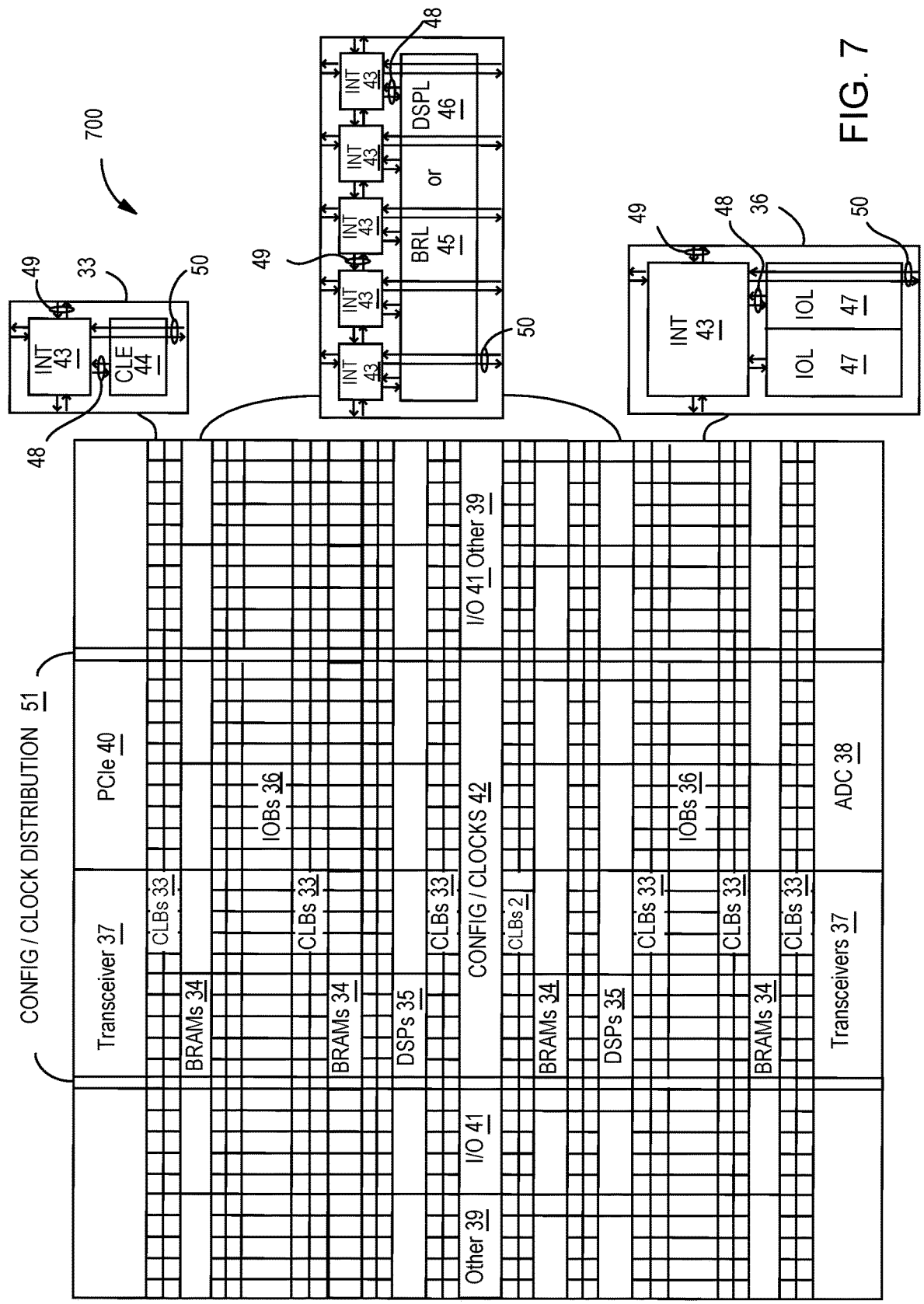
FIG. 7 illustrates a field programmable gate array implementation of a programmable IC according to an example.

FIG. 7 illustrates an FPGA 700 implementation of the I/O peripheral device 135, and more specifically with the PL array 215 in FIG. 2, that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("10") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 7. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. In one embodiment, the BRAM 34 is a part of memory which can retain stored data during reconfigurations. Typically, the number of interconnect elements included in a tile depends on the height of the tile. In the pictured example, a BRAM tile has the same height as five CLBs, but other numbers (e.g., four) can also be used. A DSP block 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual IO pads connected, for example, to the IO logic element 47 typically are not confined to the area of the input/output logic element 47.

In the pictured example, a horizontal area near the center of the die (shown in FIG. 7) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A peripheral I/O device, comprising:
a domain assist processor (DAP);
a domain accelerator; and
a gateway configured to communicatively couple the peripheral I/O device to a host using a coherent interconnect protocol, wherein the coherent interconnect protocol extends a coherent domain in the host to the peripheral I/O device such that the DAP is a peer processor to a processor in the host, wherein the gateway comprises an endpoint coherent interconnect communicatively coupled to both the DAP and the domain accelerator, and wherein the gateway is configured to:
receive a first request from the host using the coherent interconnect protocol, the first request instructing the DAP to perform a processor function, and
receive a second request from the host using the coherent interconnect protocol, the second request instructing the domain accelerator to perform an accelerator task.

2. The peripheral I/O device of claim 1, wherein the operating system is one of: an embedded, independent operating system and an extension of an operating system in the host.

3. The peripheral I/O device of claim 2, wherein an instruction set architecture (ISA) used by the processing core is different than an ISA used by the processor in the host.

4. The peripheral I/O device of claim 1, further comprising:
a programmable logic array, wherein at least a portion of the domain accelerator is executed by the programmable logic array.

5. The peripheral I/O device of claim 4, wherein at least a portion of the domain accelerator is executing on hardened circuitry.

6. The peripheral I/O device of claim 1, further comprising:
a network on a chip (NoC) communicatively coupling the gateway and the domain accelerator.

7. The peripheral I/O device of claim 1, wherein the gateway comprises a cache that is communicatively coupled between the endpoint coherent interconnect and the DAP and the domain accelerator.

8. A peripheral I/O device, comprising:
a domain assist processor (DAP);
a domain accelerator; and
a gateway configured to communicatively couple the peripheral I/O device to a host using a coherent interconnect protocol, wherein the coherent interconnect protocol extends a coherent domain in the host to the peripheral I/O device such that the DAP is a peer processor to a processor in the host, wherein the gateway is a hybrid gateway configured to establish an I/O domain and the coherent domain in the peripheral I/O device, and wherein the gateway is configured to:
receive a first request from the host using the coherent interconnect protocol, the first request instructing the DAP to perform a processor function, and
receive a second request from the host using the coherent interconnect protocol, the second request instructing the domain accelerator to perform an accelerator task.

9. A method, comprising:
identifying a processor function to offload from a CPU-memory complex in a host to a DAP in a peripheral I/O device, wherein a coherent domain including the CPU-memory complex of the host extends to the DAP in the peripheral I/O device, wherein the DAP comprises at least one processing core and an operating system, wherein the operating system is one of: an embedded, independent operating system and an extension of an operating system in the host, and wherein an instruction set architecture (ISA) used by the processing core is the same as an ISA used by a CPU in the host;

instructing, using a coherent interconnect protocol, the DAP to perform the processor function and store resulting data in a memory element in the coherent domain;

instructing, using the coherent interconnect protocol, a domain accelerator in the peripheral I/O device to process the resulting data when performing an accelerator task for the host; and receiving resulting data from performing the accelerator task on the domain accelerator.

10. The method of claim 9, wherein at least a portion of the domain accelerator is executed by a programmable logic array.

11. The method of claim 9, wherein the DAP and a CPU in the host are part of a same cache-coherent shared-memory multiprocessor paradigm.

12. The method of claim 9, further comprising:
instructing, using an I/O device driver in the host, compute resources assigned to an I/O domain in the peripheral I/O device to perform an I/O task.

13. A computing system, comprising:
a host comprising CPU-memory complex in a coherent domain;
a peripheral I/O device, comprising:
a DAP, wherein the DAP comprises at least one processing core and an operating system, wherein the operating system is one of: an embedded, independent operating system and an extension of an operating system in the host, wherein a ISA used by the processing core is different than an ISA used by a CPU in the host;
a domain accelerator; and
a gateway configured to communicatively couple the peripheral I/O device to the host using a coherent interconnect protocol, wherein the coherent interconnect protocol extends the coherent domain in the host to include the DAP, wherein the gateway is configured to:
receive a first request from the host instructing the DAP to perform a processor function, and
receive a second request from the host instructing the domain accelerator to perform an accelerator task.

14. The computing system of claim 13, wherein the peripheral I/O device further comprises:
a programmable logic array, wherein at least a portion of the domain accelerator is executed by the programmable logic array.

* * * * *